Figures 1, 2, 3:
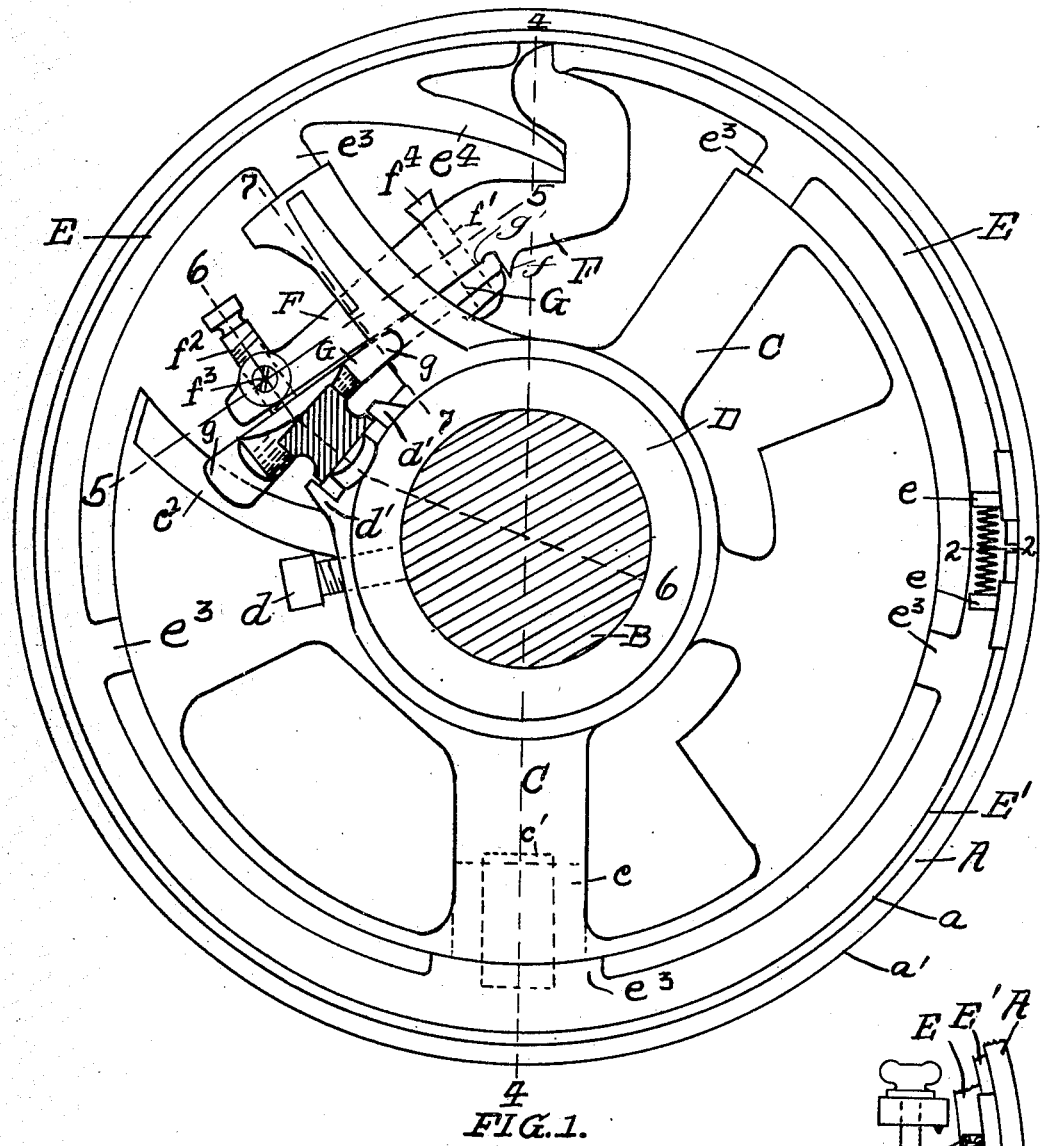

No. 870,642. PATENTED NOV. 12, 1907.
A. OSKAMP.
FRICTION CLUTCH.
APPLICATION FILED MAR. 13, 1906.

4 SHEETS—SHEET 1.

Witnesses

Inventor
Alfred Oskamp
By Parkinson & Richards
Attorneys

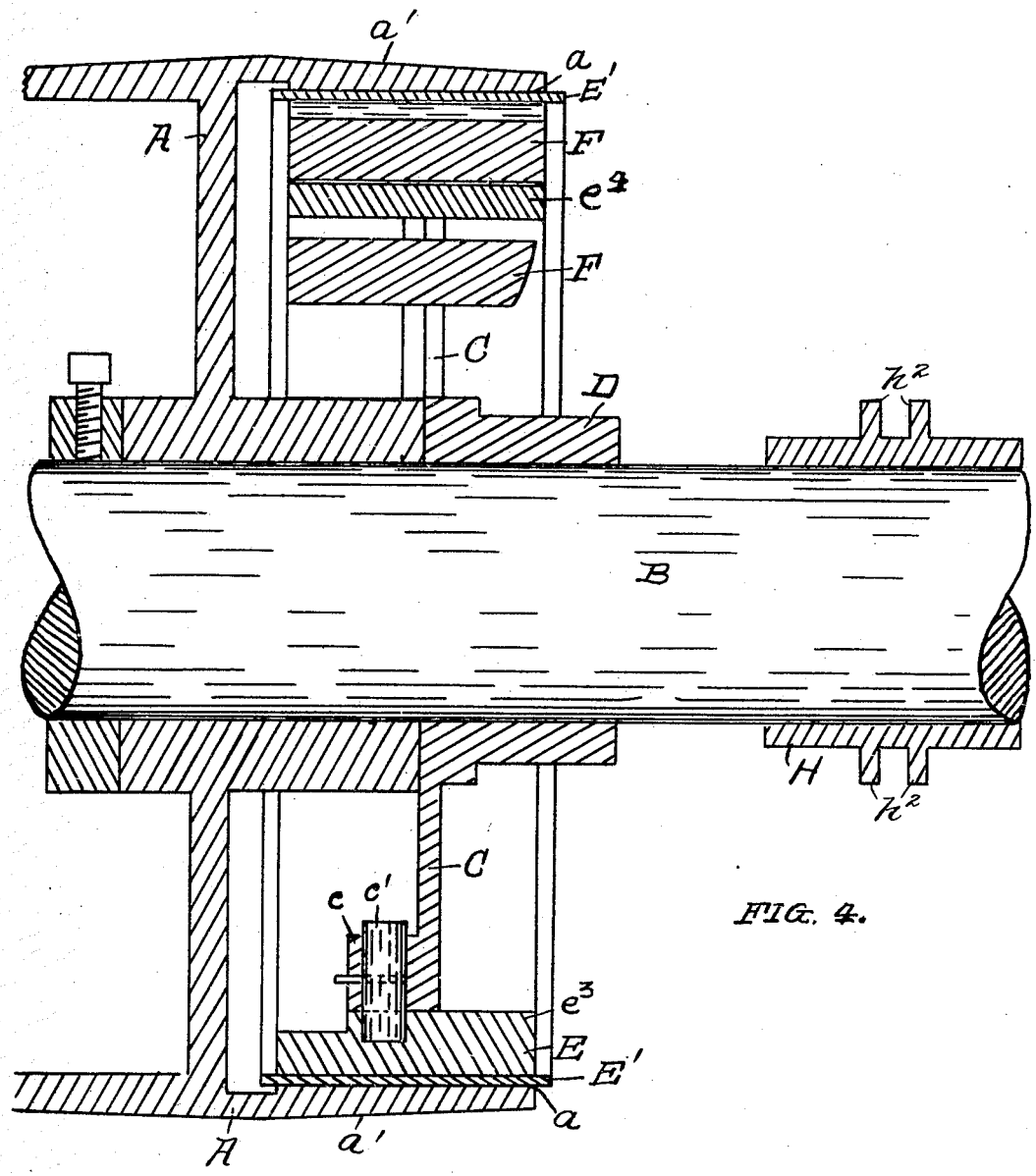

No. 870,642. PATENTED NOV. 12, 1907.
A. OSKAMP.
FRICTION CLUTCH.
APPLICATION FILED MAR. 13, 1906.
4 SHEETS—SHEET 3.
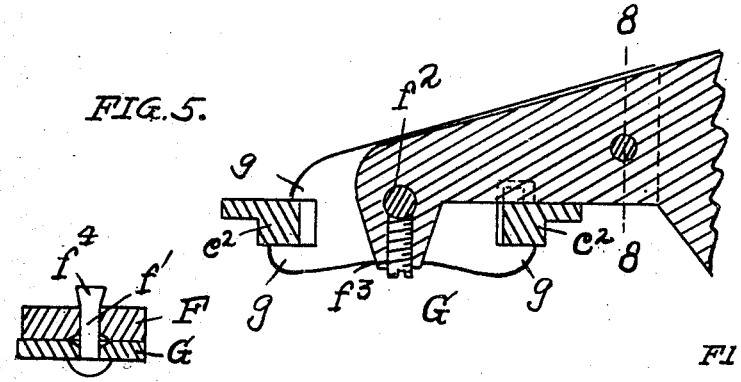
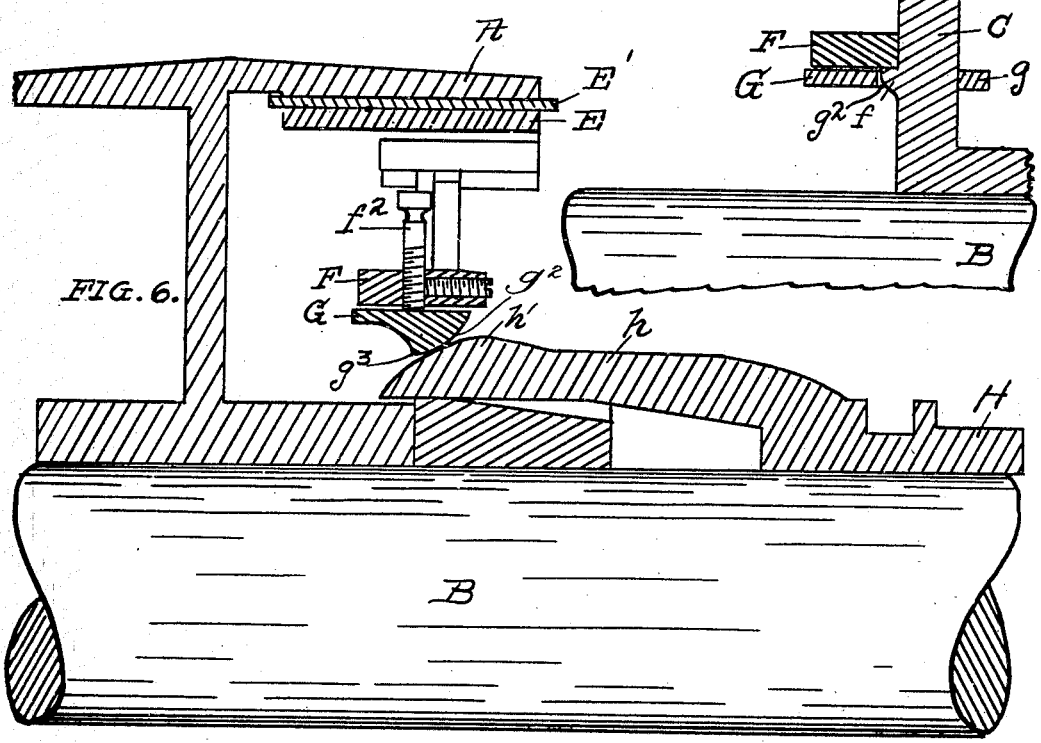
Witnesses
Inventor
Alfred Oskamp
By Parkinson & Richards
Attorneys No. 870,642. PATENTED NOV. 12, 1907.
A. OSKAMP.
FRICTION CLUTCH.
APPLICATION FILED MAR. 13, 1906.
4 SHEETS—SHEET 4.
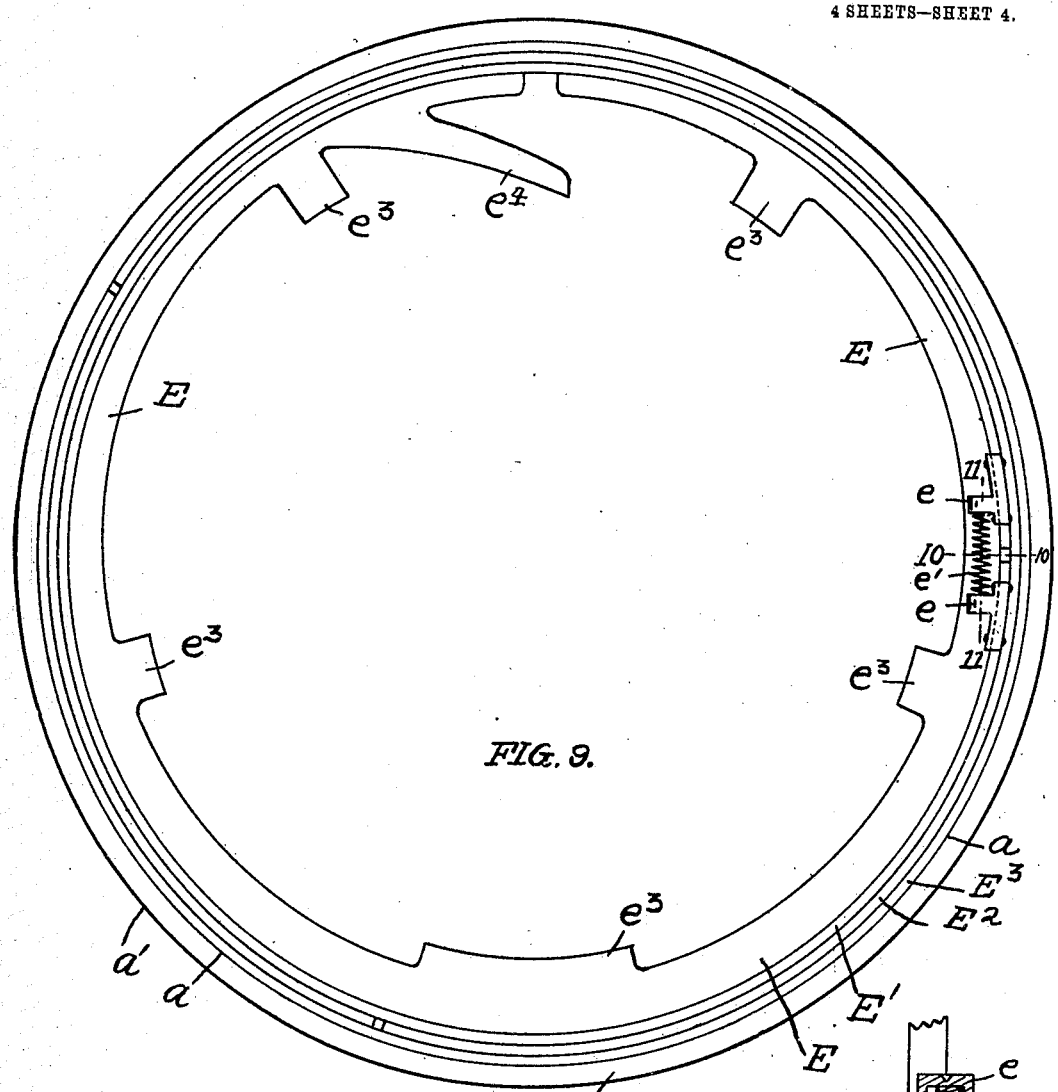
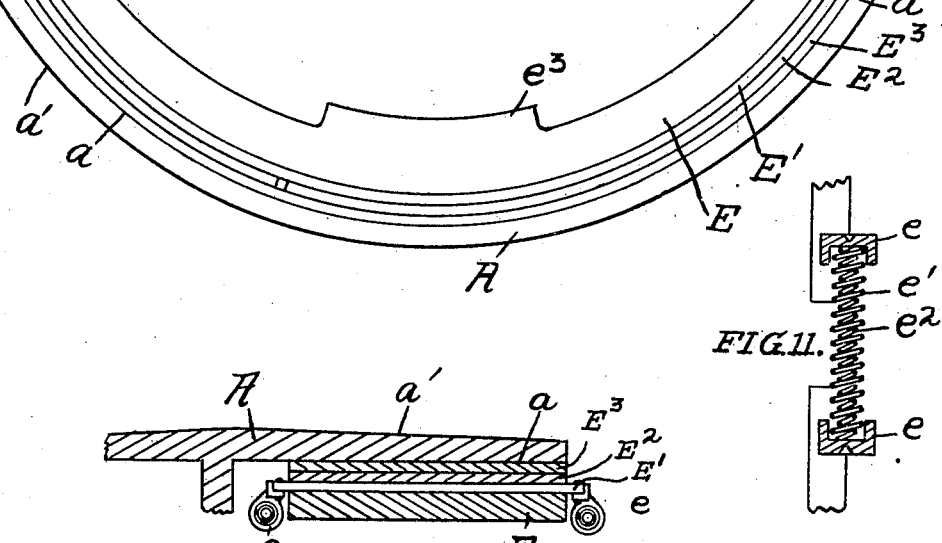
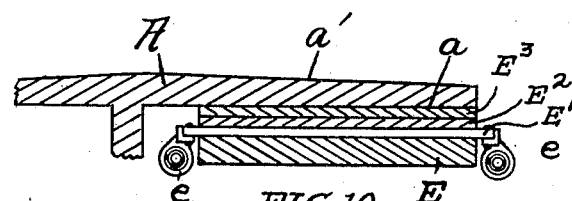
Witnesses
Inventor
Alfred Oskamp
By Parkinson & Richards
Attorneys

UNITED STATES PATENT OFFICE.

ALFRED OSKAMP, OF WYOMING, OHIO.

FRICTION-CLUTCH.

No. 870,642.  Specification of Letters Patent.  Patented Nov. 12, 1907.

Application filed March 13, 1906. Serial No. 305,753.

*To all whom it may concern:*

Be it known that I, ALFRED OSKAMP, a citizen of the United States, residing at Wyoming, in the county of Hamilton and State of Ohio, have invented certain new and useful Improvements in Friction-Clutches, of which the following is a specification.

The object of my invention is to provide a friction clutch of improved construction and operation and my invention consists in the combination and arrangement of parts hereinafter described and claimed.

In the drawings, Figure 1, is a side view of a friction clutch embodying my invention; Fig. 2, a section on line 2—2 of Fig. 1; Fig. 3, a view at right angles to Fig. 2, showing the clamp for holding the ends of the friction ring together; Fig. 4, a section on line 4—4 of Fig. 1; Fig. 5, a section on line 5—5 of Fig. 1; Fig. 6, a section on line 6—6 of Fig. 1; Fig. 7, a section on line 7—7 of Fig. 1; Fig. 8, a section on line 8—8 of Fig. 5; Fig. 9, a side view showing a modified arrangement of friction rings; Fig. 10, a section on line 10—10 of Fig. 9; and Fig. 11, an enlarged section on line 11—11 of Fig. 9.

A suitable pulley A, provided with an annular friction surface $a$, is rotatably mounted on shaft B, and adapted to be driven by a belt running on driving surface $a'$. Within the surface $a$, is a spider C carried by a hub D secured to shaft B by means of set screw $d$. A metallic friction ring E is mounted upon spider C, and is designed to contact with a loose friction ring E', lying between it and surface $a$.

The loose friction ring E' is preferably made of hard fiber and has its edges projecting slightly beyond the edges of ring E and surface $a$. A small gap is left between the ends of the loose ring and sockets $e$ are secured to the projecting edges of the ring on opposite sides of the gap at either side. Springs $e'$ and $e^2$ are compressed between each pair of sockets and serve to normally expand the ring E' against surface $a$. To facilitate placing of the ring E' in position, I provide clamps $e^5$ adapted to engage the sockets and draw them together temporarily. By this arrangement, when ring E is expanded against ring E', the latter will be expanded against surface $a$ and serve to form a frictional engagement to drive shaft B by means of pulley A when desired. It will be seen that when the tension is relieved from ring E, the force of springs $e'$ and $e^2$ will be exerted to hold ring E' expanded against surface $a$ so as to cause the ring E' to travel with pulley A without frictional contact with ring E. By securing the sockets $e$ to the projecting edges of ring E' contact between the sockets, or their securing means, and surface $a$ or ring E is prevented. Thus the full and unbroken surfaces of ring E' is afforded for frictional contact with surface $a$ and ring E. Moreover, as the frictional juncture between pulley A and ring E is being made or broken, the ring E' being loose, will slide relatively to both, thus alleviating the friction and wear on both. If desired, the ring E' may be made of leather, woven fabric or similar materials with good results.

The ring E is provided with lands $e^3$ projecting from its interior face and contacting with suitable surfaces of the spider. At one side the spider C carries a lug $c$ through which a pin $c'$ takes into a corresponding socket in ring E and thus forms a radially free driving engagement between the ring and spider. The bearing surfaces of spider C and the lands $e^3$ are dressed to a nice fit and the size of the spider is such that the ring must be slightly sprung to be placed in position thereon, in which position the exterior surface of the ring, has a slight but uniform clearance from the ring E'. At the side opposite to pin $c'$ the ring is open and the two halves of the ring gradually decrease in thickness from the pin to the gap. By this construction it will be seen that ring E is free to expand radially at all points. The increased thickness at points remote from the gap, strengthens the ring in proportion to the strains and insures uniform concentric expansion and contraction of the ring when force is applied to or relieved from its ends, thus causing uniform contact and clearance between the rings E and E'. One of the ring halves is provided with an inwardly extending flange $e^4$ slightly overlapping the radial plane through the end of the other half and an operating key F is given bearings on the end of flange $e^4$ and on the end of the other ring half. By giving key F bearings on the ring ends at or near a common radial plane, the expanding force exerted thereby is applied in a direction substantially tangent to the circle of the ring, which is the most advantageous application of force to expand the ring uniformly. A stop $f$ is placed on spider C in such location as to support key F when said key is in position. To the inner side of key F is secured a contact piece G by means of rivet $f'$ and a set screw $f^2$ is provided for adjusting the contact piece away from the key. A locking screw $f^3$ serves to lock set screw $f^2$ against turning after the contact piece has been properly adjusted. The meeting sides of key F and locking piece G are countersunk to provide a space to permit bending of the rivet $f'$ and the rivet head $f^4$ is made flaring in form so as to permit a slight "stripping" thereof when strain is applied to contact piece G by means of set screw $f^2$. By this arrangement enough flexibility is obtained to permit adjustment of contact piece G through a large arc without breaking it. The contact piece G is provided with lugs $g$ embracing members $c^2$ of the spider, to guide and hold the key F and is notched at $g'$ to pass over stop $f$. By adjusting contact piece G, greater or less movement of the key may be obtained and lost motion due to wear or other causes taken up.

A shiftable hub H is mounted on shaft B and carries a pointed nose $h$ passing between lugs $d'$ on hub D and adapted to contact with the beveled surface $g^2$ on contact piece G. It will be noted that surface $g^2$ and nose $h$ have high places $g^3$ and $h'$ respectively and that set screw $f^2$ engages contact piece G immediately over high place $g^3$. By this arrangement, when nose $h$ is forced under surface $g^2$, to expand ring E, the high place $h'$ passing high place $g^3$ locks the nose in position, and the direct strain is taken by set screw $f^2$. At first contact between nose $h$ and surface $g^2$, the flexibility in rivet $f'$ and contact piece G permits a slight rocking in contact piece G. When the high places $g^3$ and $h'$ come to pass they are directly under set screw $f'$ which causes piece G to rock back and thus roll on nose $h$, instead of sliding thereon, at the time of greatest strain. This rolling action materially lessens the friction at the time of greatest strain. The hub H carries flanges $h^2$ by means of which it may be shifted in either direction by the usual prong.

For high speeds, where the centrifugal force is great enough to overcome the resiliency in ring E and hold the ring in expanded condition, notwithstanding the fact that the tension from key F has been removed, a supplemental spring may be provided at the gap to draw the ends of the ring together and thus insure breaking of the frictional juncture.

In Figs. 9 and 10, I have illustrated a modified construction in which supplemental loose friction rings $E^2$ and $E^3$ are interposed between ring $E'$ and surface $a$. By this arrangement, as the frictional juncture is made, rings $E^3$ and $E^2$ slip upon surface $a$ and ring $E'$ and upon each other, thus greatly diminishing the friction and wear.

While I have illustrated and described the preferred construction for carrying my invention into effect, this is capable of modification without departing from the spirit of my invention. I therefore do not wish to be limited to the exact construction set forth, but

What I claim as new and desire to secure by Letters Patent is:—

1. In a key for operating friction clutches, the combination of a contact piece secured to the key by means of a rivet having a flaring head adapted to strip under strain; and a set screw adapted to press the contact piece away from the key thereby permitting adjustment through a large arc, substantially as specified.

2. In a key for operating friction clutches, the combination of a contact piece secured to the key by means of a rivet having a flaring head, the rivet hole being countersunk between the two, to form a space around the rivet; and a set screw adapted to press the contact piece away from the key, substantially as specified.

3. In a friction clutch, the combination of an element having a friction surface; a friction ring adapted to contact therewith; a key for applying the ring to the surface; a contact piece provided with a beveled surface and secured to the key by means of a rivet having a flaring head; a set screw carried by the key and engaging the contact piece immediately behind the highest portion of its beveled surface; and an operating nose adapted to engage the beveled surface on the contact piece and operate the key, substantially as specified.

4. In a friction clutch, the combination of an element having a friction surface; a friction ring adapted to contact therewith; a key for applying the ring to the surface; a contact piece provided with a beveled surface and secured to the key by means of a rivet having a flaring head, the rivet hole being countersunk between the two, to form a space around the rivet; a set screw carried by the key and engaging the contact piece immediately behind the highest portion of its beveled surface; and an operating nose adapted to engage the beveled surface on the contact piece and operate the key, substantially as specified.

5. In a friction clutch, the combination of an element having a friction surface; a friction ring adapted to contact therewith; key F contact piece G provided with a beveled surface and secured to the key by means of a rivet having a flaring head, the rivet hole being countersunk between the two to form a space around the rivet; a set screw carried by the key and engaging the contact piece immediately behind the highest point of the beveled surface; lugs $g$ engaging members $c^2$ for guiding the key; stop $f$ for limiting the movement of the key; and an operating nose adapted to engage piece G and operate the key, substantially as specified.

6. In a friction clutch, the combination of a friction surface; a metallic friction ring mounted concentrically therewith; a loose friction ring interposed between the metallic friction ring and the friction surface and projecting beyond them; sockets secured to the projecting edges of the loose ring; springs imprisoned between the sockets and adapted to expand the ring, and means for expanding the metallic ring, substantially as specified.

7. In a friction clutch, the combination of a friction surface; a metallic friction ring mounted concentrically therewith; a loose friction ring interposed between the metallic friction ring and the friction surface and projecting beyond them; sockets secured to the projecting edges of the loose ring; clamps adapted to engage sockets and relieve the tension on the ring; springs imprisoned between the sockets and adapted to expand the ring; and means for expanding the metallic ring, substantially as specified.

ALFRED OSKAMP.

Witnesses:
AGNES B. GRANT,
BRAYTON G. RICHARDS.